(12) United States Patent
Li

(10) Patent No.: US 9,009,333 B2
(45) Date of Patent: Apr. 14, 2015

(54) METHOD AND DEVICE FOR TRANSMITTING NETWORK RESOURCE INFORMATION DATA

(75) Inventor: Dingjun Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 618 days.

(21) Appl. No.: 12/742,578

(22) PCT Filed: May 29, 2008

(86) PCT No.: PCT/CN2008/071135
§ 371 (c)(1),
(2), (4) Date: May 12, 2010

(87) PCT Pub. No.: WO2009/065306
PCT Pub. Date: May 28, 2009

(65) Prior Publication Data
US 2010/0262705 A1 Oct. 14, 2010

(30) Foreign Application Priority Data

Nov. 20, 2007 (CN) .......................... 2007 1 0166488

(51) Int. Cl.
*H04W 28/00* (2009.01)
*H04L 12/751* (2013.01)
(Continued)

(52) U.S. Cl.
CPC ............... *H04W 28/00* (2013.01); *H04L 12/66* (2013.01); *G06F 15/16* (2013.01); *H04N 19/109* (2013.01);
(Continued)

(58) Field of Classification Search
CPC .............. H04L 29/08072; H04L 29/06; H04L 29/0809; H04L 29/06755; H04L 29/06836; H04L 61/1511; G06F 15/16; H04N 19/109; H04W 28/00
USPC .......................................... 709/229; 370/254
See application file for complete search history.

(56) References Cited

U.S. PATENT DOCUMENTS 4,972,437 A * 11/1990 Citron et al. .................. 375/259
5,084,870 A * 1/1992 Hutchison et al. ............ 370/258
(Continued)

FOREIGN PATENT DOCUMENTS

CN  1747467 A  3/2006
CN  1870622 A  11/2006
(Continued)

OTHER PUBLICATIONS

Aghvami et al., "Mode Switching and QoS Issues in Software Radio", 2001.*
(Continued)

*Primary Examiner* — O.C. Vostal
(74) *Attorney, Agent, or Firm* — Li & Cai Intellectual Property (USA) Office

(57) ABSTRACT

A method and device for transmitting network resource information data are provided by the present invention. The method for transmitting network resource information data includes: step 1, transmitting, by a transport layer function entity, the network resource information data including network topology and variation status information, network link bandwidth utilization status information to a transport control layer function entity; and step 2, the transport control layer function entity creating network resource status data according to the collected network resource information data, and performing resource admission control and path selection to a session according to the network resource status data, wherein, the network resource information data further comprises a traffic class and service mode information of the traffic class, resource and utilization status information of the traffic class. Therefore by using the present invention, the manner for performing resource admission control according to a single bandwidth parameter is changed and the admission control of the network resource and the resource distribution can be performed more comprehensively and exactly.

20 Claims, 4 Drawing Sheets

--- a transport layer function entity transmits the network resource information data including network topology and variation status information, network link bandwidth utilization status information to a transport control layer function entity — S202 the transport control layer function entity creates network resource status data according to the collected network resource information data, and performing resource admission control and path selection to a session according to the network resource status data — S204

(51) Int. Cl.
  *H04L 12/911*   (2013.01)
  *H04L 12/725*   (2013.01)
  *H04L 12/66*    (2006.01)
  *G06F 15/16*    (2006.01)
  *H04N 19/109*   (2014.01)
  *H04W 28/16*    (2009.01)

(52) U.S. Cl.
  CPC .............. *H04W 28/16* (2013.01); *H04L 45/02*
      (2013.01); *H04L 47/70* (2013.01); *H04L*
      *45/302* (2013.01); *H04L 47/781* (2013.01);
      *H04L 47/822* (2013.01); *H04L 47/824*
      (2013.01)

(56) References Cited

U.S. PATENT DOCUMENTS

| | | | |
|---|---|---|---|
| 5,740,164 A * | 4/1998 | Liron | 370/316 |
| 6,104,311 A * | 8/2000 | Lastinger | 340/10.51 |
| 6,195,697 B1 * | 2/2001 | Bowman-Amuah | 709/224 |
| 6,449,588 B1 * | 9/2002 | Bowman-Amuah | 703/21 |
| 6,839,321 B1 * | 1/2005 | Chiruvolu | 370/230.1 |
| 6,891,795 B1 * | 5/2005 | Hamachi et al. | 370/227 |
| 7,415,723 B2 * | 8/2008 | Pandya | 726/13 |
| 7,486,614 B2 * | 2/2009 | Yu | 370/223 |
| 7,539,210 B2 * | 5/2009 | Iovanna et al. | 370/468 |
| 7,653,005 B2 * | 1/2010 | Zou et al. | 370/252 |
| 7,693,062 B2 * | 4/2010 | Perkins et al. | 370/252 |
| 7,801,032 B2 * | 9/2010 | Liu | 370/230 |
| 7,843,843 B1 * | 11/2010 | Papp et al. | 370/252 |
| 7,899,915 B2 * | 3/2011 | Reisman | 709/228 |
| 2002/0066033 A1 * | 5/2002 | Dobbins et al. | 713/201 |
| 2002/0103943 A1 * | 8/2002 | Lo et al. | 710/2 |
| 2002/0133328 A1 * | 9/2002 | Bowman-Amuah | 703/22 |
| 2002/0188744 A1 * | 12/2002 | Mani | 709/231 |
| 2003/0179742 A1 * | 9/2003 | Ogier et al. | 370/351 |
| 2004/0008688 A1 * | 1/2004 | Matsubara et al. | 370/395.21 |
| 2004/0039803 A1 * | 2/2004 | Law | 709/223 |
| 2004/0136379 A1 * | 7/2004 | Liao et al. | 370/395.21 |
| 2004/0246973 A1 * | 12/2004 | Hoang et al. | 370/395.21 |
| 2005/0002405 A1 * | 1/2005 | Gao | 370/401 |
| 2005/0005200 A1 * | 1/2005 | Matena et al. | 714/38 |
| 2005/0018602 A1 * | 1/2005 | Labovitz | 370/229 |
| 2005/0144648 A1 * | 6/2005 | Gotwals et al. | 725/111 |
| 2005/0195741 A1 * | 9/2005 | Doshi et al. | 370/230 |
| 2005/0209799 A1 * | 9/2005 | Laurent et al. | 702/62 |
| 2005/0232157 A1 * | 10/2005 | Tyan et al. | 370/237 |
| 2006/0002312 A1 * | 1/2006 | Delattre et al. | 370/254 |
| 2006/0121924 A1 * | 6/2006 | Rengaraju et al. | 455/518 |
| 2006/0165074 A1 * | 7/2006 | Modi et al. | 370/389 |
| 2007/0110043 A1 * | 5/2007 | Girard | 370/352 |
| 2007/0165535 A1 * | 7/2007 | Zou et al. | 370/252 |
| 2007/0201366 A1 * | 8/2007 | Liu | 370/235 |
| 2007/0213038 A1 * | 9/2007 | Masseroni et al. | 455/414.3 |
| 2007/0226347 A1 * | 9/2007 | Chu et al. | 709/227 |
| 2007/0253403 A1 * | 11/2007 | Kodialam et al. | 370/351 |
| 2008/0002664 A1 * | 1/2008 | Li et al. | 370/351 |
| 2008/0046578 A1 * | 2/2008 | van der Gaast | 709/229 |
| 2008/0130627 A1 * | 6/2008 | Chen et al. | 370/351 |
| 2008/0144602 A1 * | 6/2008 | Casey | 370/352 |
| 2008/0162637 A1 * | 7/2008 | Adamczyk et al. | 709/204 |
| 2008/0291847 A1 * | 11/2008 | Zheng | 370/255 |
| 2009/0109860 A1 * | 4/2009 | Cinato et al. | 370/242 |
| 2009/0116382 A1 * | 5/2009 | Liu | 370/230 |
| 2009/0116404 A1 * | 5/2009 | Mahop et al. | 370/254 |
| 2009/0125631 A1 * | 5/2009 | Blom et al. | 709/228 |
| 2010/0177634 A1 * | 7/2010 | Kiss et al. | 370/230 |

FOREIGN PATENT DOCUMENTS

| | | |
|---|---|---|
| CN | 1889506 A | 1/2007 |
| CN | 1889566 A | 1/2007 |
| CN | 101072180 A | 11/2007 |
| CN | 101170497 A | 4/2008 |
| EP | 1718006 A1 | 11/2006 |
| WO | WO 2006/026923 A1 | 3/2006 |
| WO | WO 2007/006231 A1 | 1/2007 |
| WO | WO 2009/065306 A1 | 5/2009 |

OTHER PUBLICATIONS

Chen et al., "QoS Routing Algorithms for Multiple Traffic Classes", 2002.*
Bjorksten et al., "7 Service Modelling", 2005.*
Van Hoey et al., "Dimensioning of NGN transport networks for real-time voice applications", 2001.*
Kim et al., "The Delay Measurement using the RTCP for Real-time Service in Interworking Environment", Feb. 2007.*
Park et al., "QoS Architecture for NGN", 2001.*
Ling et al., "Research on the Adaptive QoS Paradigm of Wireless Broadband Applications in NGN", 2003.*
Wojcik, "Next Generation Networks architecture by ITU-T", Jan. 2009.*
ETSI, "Telecommunications and Internet converged Services and Protocols for Advanced Networking (TISPAN); Requirements for QoS in a NGN", ETSI TS 181 018 v2.0.0 (Aug. 2007).*
Lu, "Resource and Admission Control for Next Generation Networks", 2006.*
Yavatkar et al., "A Framework for Policy-based Admission Control", RFC 2753.*
Knightson et al., "NGN Architecture: Generic Principles, Functional Architecture, and Implementation", 2005.*
Brice et al., EP0221360A2, 1986.*
Daniell et al., EP0081056A2, 1982.*
ETSI, Draft ETSI TR 182 022, Technical Report, Telecommunications and Internet Converged Services and Protocols for Advanced Networking (TISPAN); Architectures for QoS handling, Sep. 2007.
ETSI, ETSI TS 181 018, Technical Specification, Telecommunications and Internet Converged Services and Protocols for Advanced Networking (TISPAN); Requirements for QoS in a NGN, Aug. 2007.

* cited by examiner

METHOD AND DEVICE FOR TRANSMITTING NETWORK RESOURCE INFORMATION DATA

CROSS-REFERENCE TO RELATED APPLICATIONS

This application is the U.S. national stage of International Application No. PCT/CN2008/071135, filed May 29, 2008, which claims benefit of Chinese Patent Application No. CN 200710166488.5, filed Nov. 20, 2007.

FIELD OF THE INVENTION

The present invention relates to the Next Generation Network (NGN), in particular to a method and device for a transport layer function entity of an access network or a core network to transmit the network resource information data to a transport control layer function entity.

BACKGROUND OF THE INVENTION

In the NGN proposed by the International Telecommunication Union (ITU-NGN), each transport layer function entity (transport resource enforcement function entity (TRE-FE) or policy enforcement function entity (PE-FE)) actively or passively transmits network topology and resource information to the transport control layer function entity (transport resource enforcement function entity (TRC-FE)) in time and accurately via an Rc interface.

The TRC-FE creates network resource status data according to the gathered topology and resource information, and performs resource admission control and path selection on a session according to the network resource data. The locations of the interfaces on which the information is transmitted from the transport layer FE (TRE-FE) to the transport control layer FE (TRC-FE) are the Rc (not shown in the drawing) and Re in FIG. 1 (TISPAN).

In the current Rc-related interface standards and drafts (mainly comprising Y.2111 RACF, Q.3304.1 COPS-PR Rc and Q.3304.2 SNMP Rc) defined by the ITU-T NGN, the information transmitted by the transport layer FE to the transport control layer FE mainly comprises network topology status information and its variation and bandwidth utilization status information of each link in the network.

FIG. 1 is the block diagram view of TSPAN NGN in the art, which comprises resource and admission control system (RACS), service-based policy decision function (SPDF), border gateway function (BGF), general-resource and admission control function (x-RACF), resource control enforcement function (RCEF), network attachment sub-system (NASS), application function (AF), user end (UE), basic transport function (BTF), while in TISPAN (ETSI ES 282 001 V1.1.1 (2005-08) and draft ETSI ES 182 019 V0.4.1 (2007-02)).

There is no definition relating to the collection of the network resource information in prior TSPAN NGN.

The resource information defined by the current standard comprises: network topology and variation status information and network link bandwidth utilization status information. The information is the very basic information for performing resource admission control and can only be used to perform basic, coarse grained and single dimensional resource admission control, that is, the admission control is performed according to the available bandwidth of the link in the network. However, the NGN supports very abundant services, and the sessions of some real time services have particular requirements on delay, delay jitter or packet loss ratio.

In this situation, using the current network resource information can not realize accurate resource distribution and path selection.

On the other hand, an NGN transport network should be a network able to support various traffic classes, and provide different service capabilities to different traffic classes. Similarly, in order to exactly reflect the status of the network resource utilization, each transport layer function unit should transmit the status of network resource relating to each traffic class to the transport control layer function unit, however, it has not yet been realized in the prior art.

SUMMARY OF THE INVENTION

Considering the above mentioned problems, the present invention is aimed at providing a method and device for transmitting network resource information data in the NGN, which solves the problems of incomprehensiveness and incompleteness in the transmitting of network resource utilization status in the prior art, and adds some information so as to reflect the network resource and its utilization status more completely and perfectly, thus the bearer control layer can perform admission control more exactly according to the information.

According to one aspect of the present invention, a method for transmitting network resource information data is provided, which comprises, step 1, transmitting, by a transport layer function entity, the network resource information data including network topology and variation status information, network link bandwidth utilization status information to a transport control layer function entity; and step 2, the transport control layer function entity creating network resource status data according to the collected network resource information data, and performing resource admission control and path selection to a session according to the network resource status data, wherein, the network resource information data further comprises a traffic class and service mode information of the traffic class, resource and utilization status information of the traffic class.

Wherein, the traffic class and the service mode information of the traffic class comprises the traffic class supported by a link/interface of a transport network node and the service mode information of the traffic class; the resource and utilization status information of the traffic class comprises the resource and utilization status information of the traffic class supported by the link/interface of the transport network node; the transmitting mode of the network resource information data comprises active transmitting and passive query.

In addition, the resource and utilization status information data of the traffic class comprise bandwidth, the number of packet loss and packet loss ratio, the minimum delay, the maximum delay, average delay, the minimum delay jitter, the maximum delay jitter, average delay jitter.

Wherein, step 2 comprises the following steps: when a new session request initiated by a session request initiating function entity arrives, selecting, by the transport control layer function entity, a suitable path for resource reservation and path selection according to the information of the session and the collected network resource status information data.

The information data of the session comprise at least one of the following service quality parameters of the session: bandwidth, delay, delay jitter, packet loss ratio.

When the session has requirement on the service quality parameter, the transport layer function entity selects a path satisfying the service quality parameter.

When a path satisfying the requirement on the service quality parameter of the session request exists, selecting the path, performing corresponding resource distribution, reservation and path selection, and sending a response of a successful resource admission to the session request initiating function entity; when a path satisfying the requirement on the service quality parameter of the session does not exist, sending a response of a failed resource admission to the session request initiating function entity.

The session request initiating function entity comprises a policy deciding function entity, a transport resource executing function entity, and a policy executing function entity.

In addition, the session request initiating function entity comprises a service policy deciding function entity, a border gateway function entity, and a resource control executing function entity.

According to another aspect of the present invention, a device for transmitting network resource information data is provided, which comprises, a transmitting unit, configured to transmit network resource information data including network topology and variation status information, network link bandwidth utilization status information from a transport layer function entity to a transport control layer function layer; and an admission controlling unit, configured to create network resource status data according to collected network resource information data, and perform resource admission control and path selection to a session according to the network resource status data, wherein, the network resource information data transmitted by the transmitting unit comprise a traffic class and service mode information of the traffic class, resource and utilization status information of the traffic class.

Therefore, compared with the prior art wherein resource admission control is performed according to a single bandwidth parameter, the present invention can achieve one or more dimensional resource admission control according to a plurality of parameters, such as bandwidth, delay, delay jitter and packet loss, etc., and can perform admission control and resource distribution of the network resource more comprehensively and exactly.

Other features and advantages of the present invention will be described in the following description and partly become obvious from the description, or be understood by implementing the present invention. The objects and other advantages of the present invention can be realized and obtained through the structures indicated by the description, claims and drawings.

BRIEF DESCRIPTION OF THE DRAWINGS

The drawings illustrated here provide a further understanding of the present invention and form a part of the specification, and are used to explain the present invention with embodiments of the present invention rather than limit the present invention, wherein.

DETAILED DESCRIPTION OF THE EMBODIMENTS

A detailed description is given to the preferred embodiments of the present invention with reference to the accompanying drawings. The preferred embodiment of the present invention is described so as to illustrate and explain the present invention, rather than limit the present invention.

Figure 2:
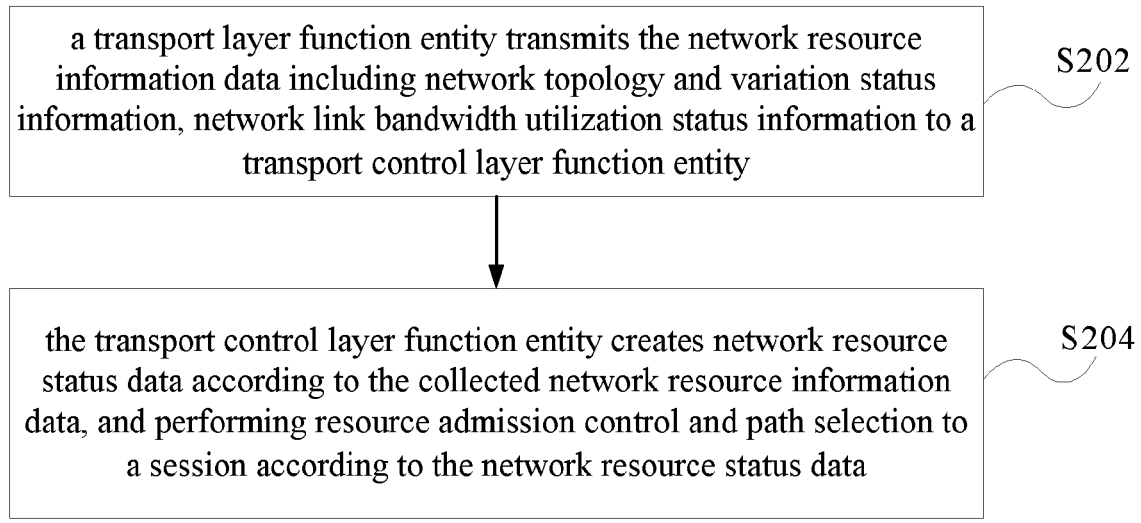
FIG. 2 is the flow chart showing the method for transmitting network resource information data according to the present invention.

FIG. 2 is the flow chart showing the method for transmitting network resource information data according to the present invention.

As shown in FIG. 2, the method for transmitting network resource information data comprises: Step S202, a transport layer function entity transmits the network resource information data including network topology and variation status information, network link bandwidth utilization status information to a transport control layer function entity; and Step S204, the transport control layer function entity creates network resource status data according to the collected network resource information data, and performing resource admission control and path selection to a session according to the network resource status data, wherein, the network resource information data further comprises a traffic class and service mode information of the traffic class, resource and utilization status information of the traffic class.

Wherein, the traffic class and the service mode information of the traffic class comprises the traffic class supported by a link/interface of a transport network node and the service mode information of the traffic class; the resource and utilization status information of the traffic class comprises the resource and utilization status information of the traffic class supported by the link/interface of the transport network node; the transmitting mode of the network resource information data comprises active transmitting and passive query.

In addition, the resource and utilization status information data of the traffic class comprise bandwidth, the number of packet loss and packet loss ratio, the minimum delay, the maximum delay, average delay, the minimum delay jitter, the maximum delay jitter, average delay jitter.

Wherein, step 2 comprises the following steps: when a new session request initiated by a session request initiating function entity arrives, the transport control layer function entity selects a suitable path for resource reservation and path selection according to the information of the session and the collected network resource status information data.

The information data of the session comprise at least one of the following service quality parameters of the session: bandwidth, delay, delay jitter, packet loss ratio.

When the session has requirement on the service quality parameter, the transport layer function entity selects a path satisfying the service quality parameter.

When a path satisfying the requirement on the service quality parameter of the session request exists, the path is selected, corresponding resource distribution, reservation and path selection are performed, and a response of a successful resource admission is sent to the session request initiating function entity; when a path satisfying the requirement on the service quality parameter of the session does not exist, a response of a failed resource admission is sent to the session request initiating function entity.

The session request initiating function entity comprises a policy deciding function entity, a transport resource executing function entity, and a policy executing function entity.

In addition, the session request initiating function entity comprises a service policy deciding function entity, a border gateway function entity, and a resource control executing function entity.

In particular, the transport layer function entity transmits the following information to the transport control layer function entity actively or passively: the network topology and variation status information, the network link bandwidth utilization status information, the traffic class supported by the link/interface of the transport network node and the service mode information of the traffic class, and the resource and utilization status information of the traffic class supported by the link/interface of the transport network node.

Figure 1:
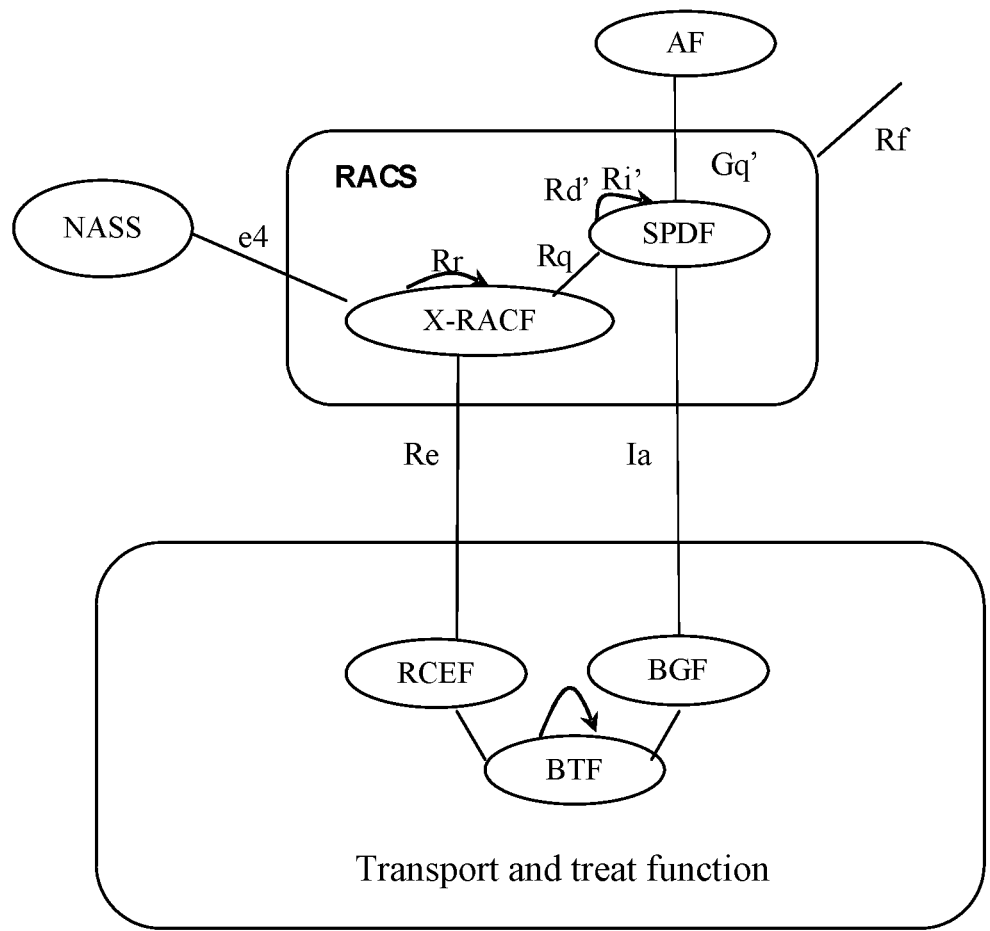
FIG. 1 is the diagram showing the framework of resource admission control system of the TISPAN NGN according to the prior art.
Figure 3:
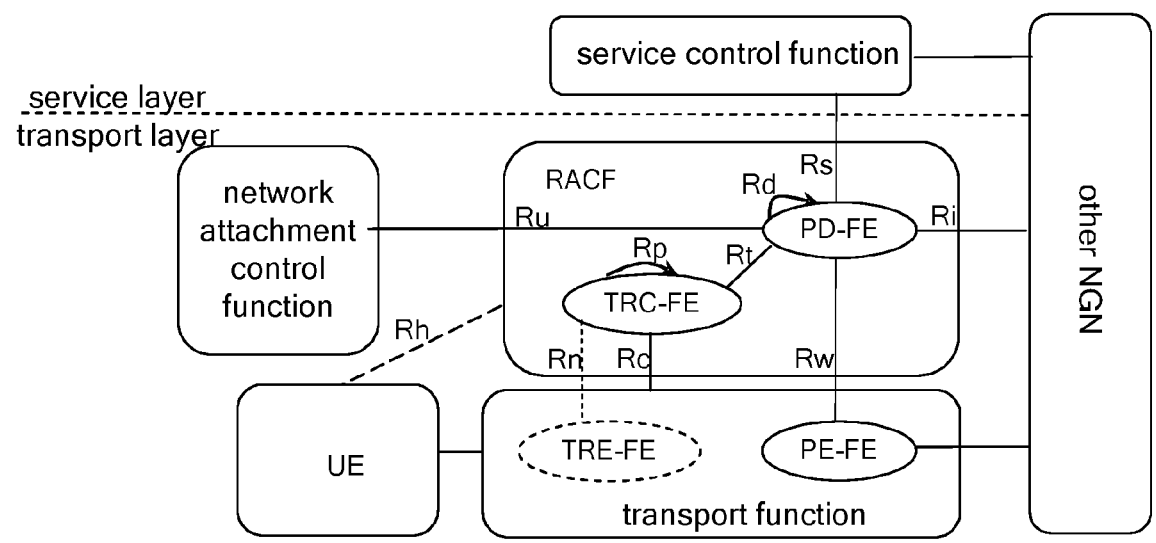
FIG. 3 is the function architecture of resource admission control employing the ITU-NGN according to a embodiment of the present invention.

The transport control layer function entity collects the information. When a new session request arrives, a suitable path is selected for resource reservation and path selection according to the requirement on bandwidth, delay, delay jitter or packet loss ratio, etc. of the session and the collected corresponding network resource information. For example, when the session has requirements on bandwidth and delay, the transport control layer function entity first selects a path with suitable bandwidth, then determines whether the path delay, which is calculated according to the delay time of the traffic class of individual nodes along the path, meets the requirement of the session request. If the requirements of the session request are satisfied, the path is selected, and corresponding resource distribution, reservation and path selection are performed; if the requirements of the session request are not satisfied, another path will be selected; if no path satisfies the requirements, other function entities (Policy Decision Function Entity (PD-FE)) will be informed that resource admission control failed and there is no enough resource. Besides, under the TISPAN case as shown in FIG. 1, the TRE-FE or the PE-FE, which initiates the session request, can be informed that the resource control failed. In addition, under the ITU-T case as shown in FIG. 3, the SPDF, RCEF or BGF, which initiates the session request, can be informed that the resource control failed.

The embodiments of the present invention will be described in detail as follows.

The method for transmitting network resource information data according to the present invention comprises the following steps:

step 1, the network resource information data transmitted to the transport control layer FE by the transport layer FE further comprise the following content: the traffic class supported by a certain link/interface of a certain transport network node and the service mode information of the traffic class, wherein, if four traffic classes are supported, the service mode of priority scheduling will be employed; the resource and utilization status information of a certain traffic class on a certain link/interface of a certain transport network node, for example, bandwidth, the number of packet loss and packet loss ratio, the minimum delay, the maximum delay, average delay, the minimum delay jitter, the maximum delay jitter, and average delay jitter, etc.; and step 2, the transport control layer FE creates network resource status data according to the collected network resource information data, and performs resource admission control and path selection to a session according to the network resource status data.

As such, the network resource information data can be actively transmitted or passively queried; and a corresponding method has to be employed to ensure that related data can be exactly transmitted in time.

FIG. 3 is the function architecture of resource admission control employing the ITU-NGN according to an embodiment of the present invention, which comprises transport resource enforcement function entity (TRE-FE), policy enforcement function entity (PE-FE), transport resource control function entity (TRC-FE), policy decision function entity (PD-FE), and resource admission control function (RACF).

In FIG. 3, the Rs interface is responsible for the related interactive process of requesting service session abstract resource performed by the SCF and the PD-FE of the RACF, the Rt interface is responsible for the related interactive process of requesting and distributing session network resources performed by the PD-FE and the TRC-FE, the Rw interface is responsible for the PD-FE and the PE-FE to distribute corresponding policies, such as traffic rate limitation, traffic mark, and gateway function, etc.

With reference to the ITU-T NGN, the related implementation method is described as follows.

In the ITU-T NGN, the TRC-FE collects the resource utilization information and status information of each service traffic class of each link of each network element of the transport network, for example, bandwidth utilization information and delay information of each service traffic class. When a new service session request arrives, the TRC-FE selects a path having enough remaining bandwidth to serve the service traffic, wherein the selected path has a corresponding service traffic class and a corresponding delay as required. And the TRE-FE is informed about the selected path and a corresponding transport execution policy via an Rn interface. When the service traffic arrives at the transport network, the TRE-FE performs, according to the resource execution policy previously indicated by the TRC-FE, a corresponding scheduling and forwarding on the service traffic through the determined path, so as to satisfy the requirements on various QoS parameters of the service.

Figure 4:
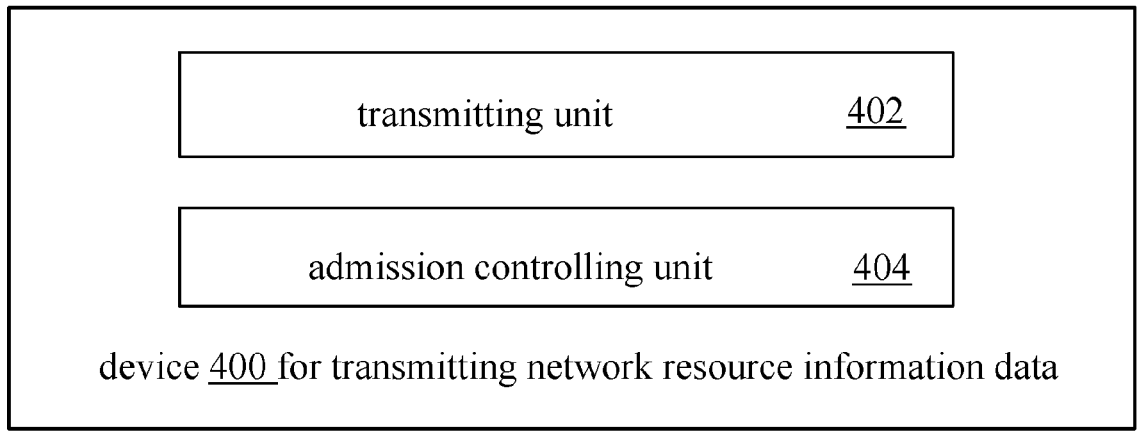
FIG. 4 is the block diagram showing the structure of the device for transmitting network resource information data according to the present invention.

FIG. 4 is the block diagram showing the structure of the device for transmitting network resource information data according to the present invention.

As shown in FIG. 4, the device 400 for transmitting network resource information data comprises, a transmitting unit 402, configured to transmit network resource information data including network topology and variation status information, network link bandwidth utilization status information from a transport layer function entity to a transport control layer function layer; and an admission controlling unit 404, configured to create network resource status data according to collected network resource information data, and perform resource admission control and path selection to a session according to the network resource status data, wherein, the network resource information data transmitted by the transmitting unit 402 comprise a traffic class and service mode information of the traffic class, resource and utilization status information of the traffic class.

Based on the above description, compared with the prior art wherein resource admission control is performed according to a single bandwidth parameter, the present invention can achieve one or more dimensional resource admission control according to a plurality of parameters, such as bandwidth, delay, delay jitter and packet loss, etc., and can perform admission control and resource distribution of the network resource more comprehensively and exactly.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for transmitting network resource information data, comprising, step 1, transmitting, by a transport layer function entity node, the network resource information data including network topology and variation information of the network topology, network link bandwidth utilization status information to a transport control layer function entity node; and step 2, the transport control layer function entity node creating network resource status data according to the collected network resource information data, and performing resource admission control and path selection to a session according to the network resource status data, wherein, the network resource information data further comprises a traffic class and service mode information of the traffic class, resource and utilization status information of the traffic class.

2. The method for transmitting network resource information data according to claim 1, wherein, the traffic class and the service mode information of the traffic class comprises the traffic class supported by a link/interface of a transport network node and the service mode information of the traffic class;

the resource and utilization status information of the traffic class comprises the resource and utilization status information of the traffic class supported by the link/interface of the transport network node;

the transmitting mode of the network resource information data comprises active transmitting and passive query.

3. The method for transmitting network resource information data according to claim 1, wherein, the resource and utilization status information data of the traffic class comprise bandwidth, the number of packet loss and a packet loss ratio, a minimum delay, a maximum delay, an average delay, a minimum delay jitter, a maximum delay jitter, an average delay jitter.

4. The method for transmitting network resource information data according to claim 1, wherein, step 2 comprises the following steps:

when a new session request initiated by a session request initiating function entity arrives, selecting, by the transport control layer function entity, a suitable path for resource reservation and path selection according to the information of the session and the collected network resource status information data.

5. The method for transmitting network resource information data according to claim 2, wherein, step 2 comprises the following steps:

when a new session request initiated by a session request initiating function entity arrives, selecting, by the transport control layer function entity, a suitable path for resource reservation and path selection according to the information of the session and the collected network resource status information data.

6. The method for transmitting network resource information data according to claim 3, wherein, step 2 comprises the following steps:

when a new session request initiated by a session request initiating function entity arrives, selecting, by the transport control layer function entity, a suitable path for resource reservation and path selection according to the information of the session and the collected network resource status information data.

7. The method for transmitting network resource information data according to claim 4, wherein, the information data of the session comprise at least one of following service quality parameters of the session: bandwidth, delay, delay jitter, packet loss ratio.

8. The method for transmitting network resource information data according to claim 5, wherein, the information data of the session comprise at least one of following service quality parameters of the session: bandwidth, delay, delay jitter, packet loss ratio.

9. The method for transmitting network resource information data according to claim 6, wherein, the information data of the session comprise at least one of following service quality parameters of the session: bandwidth, delay, delay jitter, packet loss ratio.

10. The method for transmitting network resource information data according to claim 7, wherein, when the session has requirement on the service quality parameter, selecting, by the transport layer function entity, a path satisfying the service quality parameter.

11. The method for transmitting network resource information data according to claim 8, wherein, when the session has requirement on the service quality parameter, selecting, by the transport layer function entity, a path satisfying the service quality parameter.

12. The method for transmitting network resource information data according to claim 9, wherein, when the session has requirement on the service quality parameter, selecting, by the transport layer function entity, a path satisfying the service quality parameter.

13. The method for transmitting network resource information data according to claim 10, wherein, when a path satisfying the requirement on the service quality parameter of the session request exists, selecting the path, performing corresponding resource distribution, reservation and path selection, and sending a response of a successful resource admission to the session request initiating function entity;

when a path satisfying the requirement on the service quality parameter of the session does not exist, sending a response of a failed resource admission to the session request initiating function entity.

14. The method for transmitting network resource information data according to claim 11, wherein, when a path satisfying the requirement on the service quality parameter of the session request exists, selecting the path, performing corresponding resource distribution, reservation and path selection, and sending a response of a successful resource admission to the session request initiating function entity;

when a path satisfying the requirement on the service quality parameter of the session does not exist, sending a response of a failed resource admission to the session request initiating function entity.

15. The method for transmitting network resource information data according to claim 12, wherein, when a path satisfying the requirement on the service quality parameter of the session request exists, selecting the path, performing corresponding resource distribution, reservation and path selection, and sending a response of a successful resource admission to the session request initiating function entity;

when a path satisfying the requirement on the service quality parameter of the session does not exist, sending a response of a failed resource admission to the session request initiating function entity.

16. The method for transmitting network resource information data according to claim 13, wherein, the session request initiating function entity comprises a policy deciding function entity, a transport resource executing function entity, and a policy executing function entity.

17. The method for transmitting network resource information data according to claim 14, wherein,
the session request initiating function entity comprises a policy deciding function entity, a transport resource executing function entity, and a policy executing function entity.

18. The method for transmitting network resource information data according to claim 15, wherein,
the session request initiating function entity comprises a policy deciding function entity, a transport resource executing function entity, and a policy executing function entity.

19. The method for transmitting network resource information data according to claim 13, wherein,
the session request initiating function entity comprises a service policy deciding function entity, a border gateway function entity, and a resource control executing function entity.

20. A device for transmitting networks resource information data, comprising, a transmitting entity node, configured to transmit network resource information data including network topology and variation information of the network topology, network link bandwidth utilization status information form a transport layer function entity node to a transport control layer function layer; and an admission controlling entity node, connected to the transmitting entity node and configured to create network resource status data according to collected network resource information data, and perform resource admission control and path selection to a session according to the network resource status data, wherein, the network resource information data transmitted by the transmitting entity node comprise a traffic class and service mode information of the traffic class, resource and utilization status information of the traffic class.

* * * * *